(12) United States Patent
Tanabe et al.

(10) Patent No.: US 10,536,810 B2
(45) Date of Patent: Jan. 14, 2020

(54) ELECTRONIC APPARATUS, CONTROL METHOD, AND NON-TRANSITORY COMPUTER-READABLE RECORDING MEDIUM

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Kawasaki (JP); Tetsushi Wakasa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/163,355

(22) Filed: Oct. 17, 2018

(65) Prior Publication Data

US 2019/0053009 A1    Feb. 14, 2019

Related U.S. Application Data

(63) Continuation of application No. PCT/JP2017/014601, filed on Apr. 10, 2017.

(30) Foreign Application Priority Data

Apr. 26, 2016  (JP) .................................. 2016-088614

(51) Int. Cl.
*H04W 4/02* (2018.01)
*G08G 1/09* (2006.01)
*H04W 4/30* (2018.01)

(52) U.S. Cl.
CPC .............. *H04W 4/027* (2013.01); *G08G 1/09* (2013.01); *H04W 4/30* (2018.02)

(58) Field of Classification Search
CPC ......... G08G 1/09; G08G 1/166; H04W 4/027; H04W 4/046; H04W 4/46; G06K 9/00348; B60Q 1/525; B60Q 5/006
See application file for complete search history.

(56) References Cited

U.S. PATENT DOCUMENTS 5,289,181 A    2/1994  Watanabe et al.
7,116,992 B1   10/2006  Tsunehara et al.
(Continued)

FOREIGN PATENT DOCUMENTS

DE    10 2013 002 284 A1    8/2014
DE    10 2014 219 148 A1    3/2016
(Continued)

*Primary Examiner* — Mirza F Alam
(74) *Attorney, Agent, or Firm* — Studebaker & Brackett PC

(57) ABSTRACT

An electronic apparatus comprises an accelerometer, an air-pressure sensor, a communication unit, and an at least one processor. The at least one processor performs determination processing of determining whether probability that the user will move on a road at the intersection after the user approaches the intersection is high based on change in the air-pressure value if the at least one processor detects approach of the user to the intersection when the user is moving in a predetermined movement manner. The at least one processor sends a notification that the user will move on the intersection to a roadside unit if the probability that the user will move on a road at the intersection is high. The at least one processor does not send a notification that the user will move on the intersection to a roadside unit if the probability is not high.

6 Claims, 6 Drawing Sheets

(56) References Cited

U.S. PATENT DOCUMENTS

| | | |
|---|---|---|
| 9,505,412 B2 * | 11/2016 | Bai .................... G08B 21/06 |
| 9,646,496 B1 | 5/2017 | Miller |
| 2010/0100324 A1 | 4/2010 | Caminiti et al. |
| 2013/0000156 A1 | 1/2013 | Andoh |
| 2014/0051346 A1 * | 2/2014 | Li ........................ H04W 4/046 |
| | | 455/3.01 |
| 2014/0066097 A1 | 3/2014 | Kolodziej |
| 2014/0112538 A1 * | 4/2014 | Ogawa .................. G08G 1/166 |
| | | 382/103 |
| 2014/0368716 A1 | 12/2014 | Maruyama et al. |
| 2015/0035685 A1 * | 2/2015 | Strickland ............. B60Q 9/008 |
| | | 340/901 |
| 2015/0091740 A1 * | 4/2015 | Bai .................... G08B 21/06 |
| | | 340/901 |
| 2015/0304817 A1 | 10/2015 | Yorifuji |
| 2016/0005287 A1 | 1/2016 | Yamaoka |
| 2017/0103640 A1 | 4/2017 | Deuter et al. |
| 2017/0268896 A1 | 9/2017 | Bai et al. |

FOREIGN PATENT DOCUMENTS

| | | |
|---|---|---|
| JP | H04-199500 A | 7/1992 |
| JP | 2002-056495 A | 2/2002 |
| JP | 2003-240569 A | 8/2003 |
| JP | 2005-004542 A | 1/2005 |
| JP | 2005-286817 A | 10/2005 |
| JP | 2006-103602 A | 4/2006 |
| JP | 2006-175206 A | 7/2006 |
| JP | 2006-343480 A | 12/2006 |
| JP | 2008-217120 A | 9/2008 |
| JP | 2009-098854 A | 5/2009 |
| JP | 2011-035517 A | 2/2011 |
| JP | 2011-097394 A | 5/2011 |
| JP | 2011-138250 A | 7/2011 |
| JP | 2012-252645 A | 12/2012 |
| JP | 2013-008311 A | 1/2013 |
| JP | 2013-131143 A | 7/2013 |
| JP | 2013-137606 A | 7/2013 |
| JP | 2013-239853 A | 11/2013 |
| JP | 2014-017865 A | 1/2014 |
| JP | 2014-164484 A | 9/2014 |
| JP | 2014-191667 A | 10/2014 |
| JP | 2015-210170 A | 11/2015 |
| JP | 2015-219641 A | 12/2015 |
| WO | 2001/077621 A1 | 10/2001 |
| WO | 2011/114977 A1 | 9/2011 |

* cited by examiner

ELECTRONIC APPARATUS, CONTROL METHOD, AND NON-TRANSITORY COMPUTER-READABLE RECORDING MEDIUM

CROSS-REFERENCE TO RELATED APPLICATION

The present application is a continuation based on PCT Application No. PCT/JP2017/014601 filed on Apr. 10, 2017, which claims the benefit of Japanese Application No. 2016-088614, filed on Apr. 26, 2016. PCT Application No. PCT/JP2017/014601 is entitled "ELECTRONIC APPARATUS, CONTROL METHOD, AND CONTROL PROGRAM", and Japanese Application No. 2016-088614 is entitled "ELECTRONIC APPARATUS, CONTROL METHOD, AND CONTROL PROGRAM". The contents of which are incorporated by reference herein in their entirety.

FIELD

Embodiments of the present disclosure generally relate to an electronic apparatus, a control method, and a non-transitory computer-readable recording medium.

BACKGROUND

Hitherto, there has been an electronic apparatus that informs the electronic apparatus or another apparatus at a predetermined timing.

SUMMARY

An electronic apparatus, a control method, and a non-transitory computer-readable recording medium are disclosed. In one embodiment, an electronic apparatus comprises an accelerometer configured to detect an acceleration value, an air-pressure sensor configured to detect an air-pressure value, a communication unit configured to receive information for recognizing approach of a user of the electronic apparatus to an intersection, and an at least one processor configured to determine whether the user is moving in a predetermined movement manner based on the acceleration value. The at least one processor detects approach of the user to the intersection based on reception of the information if the user is moving in a predetermined movement manner. The at least one processor performs determination processing of determining whether probability that the user will move on a road at the intersection after the user approaches the intersection is high based on change in the air-pressure value if the at least one processor detects approach of the user to the intersection. The at least one processor sends a notification that the user will move on the intersection to a roadside unit if the probability that the user will move on a road at the intersection is high as a result of the determination processing. The at least one processor does not send a notification that the user will move on the intersection to a roadside unit, if the probability that the user will move on a road at the intersection is not high as a result of the determination processing.

In one embodiment, a control method is a control method executed by an electronic apparatus. The electronic apparatus comprises an accelerometer configured to detect an acceleration value, an air-pressure sensor configured to detect an air-pressure value, and a communication unit configured to receive information for recognizing approach of a user of the electronic apparatus to an intersection. The control method comprises a step of determining whether the user is moving in a predetermined movement manner based on the acceleration value. The control method comprises a step of detecting approach of the user to the intersection based on reception of the information if the user is moving in a predetermined movement manner. The control method comprises a step of determining whether probability that the user will move on a road at the intersection after the user approaches the intersection is high based on change in the air-pressure value if approach of the user to the intersection is detected. The control method comprises a step of sending a notification that the user will move on the intersection to a roadside unit if determination is made that the probability that the user will move on a road at the intersection is high.

In one embodiment, a non-transitory computer-readable recording medium stores a control program of making an electronic apparatus execute each of the following processes. The electronic apparatus comprises an accelerometer configured to detect an acceleration value, an air-pressure sensor configured to detect an air-pressure value, and a communication unit configured to receive information for recognizing approach of a user of the electronic apparatus to an intersection. The control program makes the electronic apparatus execute a process of determining whether the user is moving in a predetermined movement manner based on the acceleration value. The control program makes the electronic apparatus execute a process of detecting approach of the user to the intersection based on reception of the information if the user is moving in a predetermined movement manner. The control program makes the electronic apparatus execute a process of determining whether probability that the user will move on a road at the intersection after the user approaches the intersection is high based on change in the air-pressure value if approach of the user to the intersection is detected. The control program makes the electronic apparatus execute a process of sending a notification that the user will move on the intersection to a roadside unit if determination is made that the probability that the user will move on a road at the intersection is high.

DETAILED DESCRIPTION

A plurality of embodiments for carrying out an electronic apparatus, a control method, and a control program according to the present disclosure will be described in detail with reference to the drawings.

In the following, description will be given of a smartphone as one example of the electronic apparatus according to the present disclosure. A portable electronic apparatus can be carried by a user. As long as the portable electronic apparatus is an electronic apparatus having a function of measuring acceleration and air pressure, the portable electronic apparatus may be an apparatus other than a smartphone. For example, the portable electronic apparatus may be an apparatus such as a mobile phone, a tablet, a portable personal computer, a digital camera, a media player, an electronic book reader, a navigator, a pedometer, an activity meter, a wearable device, a head mounted display, hearing aids, earphones, and a gaming machine. Examples of a wearable device include a wristwatch type, an eyeglass type, a shoe type, a hairband type, a key type, a necklace type, a collar type, a finger ring type, a bracelet type, and a bag type.

Figure 1:
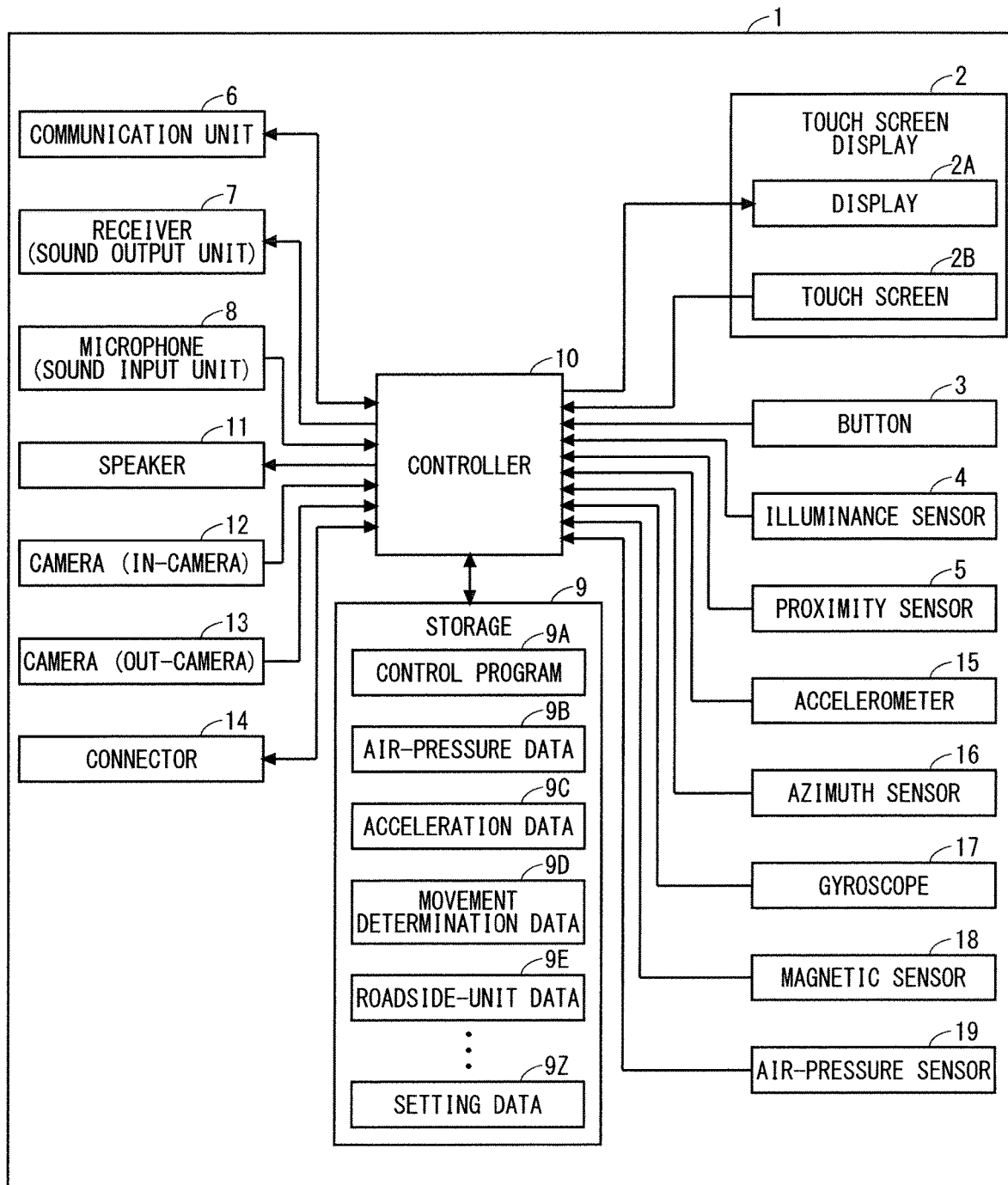
FIG. 1 illustrates a block diagram showing one example of a functional configuration of a smartphone.

FIG. 1 illustrates a block diagram showing one example of a functional configuration of a smartphone 1. In the description below, the same reference symbols may be given to like components. In the description below, overlapping description may be omitted. In the description below, the smartphone 1 may be referred to as a "subject apparatus."

As illustrated in FIG. 1, the smartphone 1 comprises a touch screen display 2, a button 3, an illuminance sensor 4, a proximity sensor 5, a communication unit 6, a receiver 7, a microphone 8, a storage 9, a controller 10, a speaker 11, a camera 12, a camera 13, a connector 14, an accelerometer 15, an azimuth sensor 16, a gyroscope 17, a magnetic sensor 18, and an air-pressure sensor 19.

The touch screen display 2 comprises a display 2A and a touch screen 2B. The display 2A and the touch screen 2B may be, for example, located in an overlapping manner, located side by side, or located away from each other. If the display 2A and the touch screen 2B are located in an overlapping manner, for example, one or more sides of the display 2A need not extend along any side of the touch screen 2B.

The display 2A comprises a display device such as a liquid crystal display (LCD), an organic electro-luminescence display (OELD), and an inorganic electro-luminescence display (IELD). The display 2A can display an object such as letters, images, symbols, and figures in a screen. The screen including the object displayed by the display 2A includes a screen referred to as a lock screen, a screen referred to as a home screen, and an application screen displayed during execution of an application. The home screen may also be referred to as a desktop, a standby screen, an idle screen, a standard screen, an application list screen, and a launcher screen.

The touch screen 2B can detect contact or proximity of a finger, a pen, a stylus pen, or the like on or toward the touch screen 2B. When fingers, a pen, a stylus pen, or the like comes in contact with or comes closer to the touch screen 2B, the touch screen 2B can detect the position thereof on the touch screen 2B. In the description below, the position where fingers, a pen, a stylus pen, or the like as detected by the touch screen 2B comes in contact with or comes closer to the touch screen 2B is referred to as a "detection position." The touch screen 2B can notify the controller 10 about the contact or the proximity of a finger on or toward the touch screen 2B together with the detection position. The touch screen 2B may notify the controller 10 about a detection position, to thereby further notify the controller 10 about detection of contact or proximity. The touch screen display 2 comprising the touch screen 2B can execute operation that can be performed by the touch screen 2B. In other words, operation performed by the touch screen 2B may be performed by the touch screen display 2.

The controller 10 can distinguish types of gesture based on at least one of contact or proximity detected by the touch screen 2B, a detection position, change in a detection position, duration of contact or proximity, interval of detections of contact or proximity, and the number of times of detection of contact. The smartphone 1 comprising the controller 10 can execute operation that can be performed by the controller 10. In other words, the smartphone 1 may perform operation performed by the controller 10. The gesture is an operation performed on the touch screen 2B using a finger. Operation performed on the touch screen 2B may be performed on the touch screen display 2 comprising the touch screen 2B. Examples of the gesture distinguished by the controller 10 via the touch screen 2B include touch, long touch, release, swipe, tap, double tap, long tap, drag, flick, pinch-in, and pinch-out. Elements included as the gesture distinguished by the controller 10 are not only limited thereto.

A detection method of the touch screen 2B may be any method, such as an electrostatic capacitance method, a resistance film method, a surface acoustic wave method, an infrared method, and a load detection method.

The button 3 can receive an operation input from the user. Regarding the number of buttons 3, either of a single button 3 or a plurality of buttons 3 is acceptable. The button 3 is one example of an operation button.

The illuminance sensor 4 can detect illuminance. Illuminance is a value of a flux of light incident on a unit area in a measurement area of the illuminance sensor 4. The illuminance sensor 4 is, for example, used for adjusting brightness of the display 2A.

The proximity sensor 5 can detect presence of a nearby object in a touchless manner. The proximity sensor 5 can detect presence of an object based on change in a magnetic field, change in a returning time period of a reflected wave of an ultrasonic wave, or the like. The proximity sensor 5 can detect, for example, approach between the display 2A and a face. The illuminance sensor 4 and the proximity sensor 5 may be formed as one sensor. The illuminance sensor 4 may also be used as a proximity sensor.

The communication unit 6 can wirelessly communicate. Wireless communication standards supported by the communication unit 6 include a communication standard for a cellular phone, such as 2G, 3G, 4G, and 5G, and a communication standard for short-range wireless communication. Examples of the communication standard for a cellular phone include Long Term Evolution (LTE), Wideband Code Division Multiple Access (W-CDMA), Worldwide Interoperability for Microwave Access (trademark) (WiMAX), CDMA2000, Personal Digital Cellular (PDC), Global System for Mobile Communications (trademark) (GSM), and Personal Handy-phone System (PHS). Examples of the communication standard for short-range wireless communication include IEEE802.11, Bluetooth (trademark), Infrared Data Association (IrDA), Near Field Communication (NFC), and Wireless Personal Area Network (WPAN). The communication standard for WPAN includes, for example, ZigBee (trademark). The communication unit 6 may support a single or a plurality of the communication standards described above. In one example of one embodiment, the communication unit 6 can further support a plurality of communication standards for enabling communication with a roadside unit built at the vicinity of an intersection. In one example of one embodiment, the communication unit 6 can receive a radio wave sent from a roadside unit, which sends a radio wave that can be received by apparatus present within a predetermined communication area including an intersection.

The receiver 7 can output a sound signal sent from the controller 10 as sound. The receiver 7 can, for example, output sound of a video and sound of music played by the smartphone 1, and a voice of a calling partner. The microphone 8 can convert an incoming voice of the user etc. into a sound signal, and can send the converted signal to the controller 10.

The storage 9 can store a program and data. The storage 9 may be used as a working area where processing results of the controller 10 are temporarily stored. The storage 9 may comprise any non-transitory storage medium such as a semiconductor storage medium and a magnetic storage medium. The storage 9 may comprise a plurality of types of storage media. The storage 9 may comprise a combination of a storage medium such as a memory card, an optical disc, and a magneto-optical disk, and a reader for the storage medium. The storage 9 may comprise a storage device such as random access memory (RAM) that is used as a temporary storage area.

Programs stored in the storage 9 include applications to be executed in the foreground or the background, and a support program (not shown) that supports operation of the applications. When an application is executed in the foreground, for example, the application can display a screen relating to the application in the display 2A. Examples of the support program include an OS. The programs may be installed in the storage 9 via wireless communication performed by the communication unit 6 or via a non-transitory storage medium.

The storage 9 can store a control program 9A, air-pressure data 9B, acceleration data 9C, movement determination data 9D, roadside-unit data 9E, setting data 9Z, etc. When providing various functions, the control program 9A can cooperate with various applications. The control program 9A may cooperate with a cloud storage via the communication unit 6, and may access files and data stored in the cloud storage. The cloud storage may store a part or all of the programs and data stored in the storage 9.

The control program 9A can provide functions related to operation of the smartphone 1. In one example of one embodiment, the control program 9A can provide each of the functions below.

The control program 9A can provide a function of determining whether the user of the subject apparatus is moving in a predetermined movement manner, based on an acceleration value as a detection result of the accelerometer 15. Specifically, the control program 9A can measure vibration and movement that affects the subject apparatus, based on direction and magnitude of acceleration as a detection result of the accelerometer 15. The control program 9A can compare the measurement result of measured vibration and movement with the movement determination data 9D, and can determine based on the result whether the user of the subject apparatus is moving in a predetermined movement manner. The control program 9A can select, out of the movement determination data 9D, a previously measured piece of data about vibration and movement that affects the subject apparatus when the user carrying the subject apparatus is moving in a predetermined movement manner, and can use the piece of data for determination. In one example of one embodiment, to be moving in a predetermined movement manner includes to be moving while the user of the subject apparatus is walking or while the user of the subject apparatus is running.

If the control program 9A determines that the user of the subject apparatus is moving in a predetermined movement manner, the control program 9A can provide a function of detecting approach of the user to an intersection by receiving a radio wave sent from a roadside unit.

If the control program 9A detects approach of the user of the subject apparatus to an intersection, the control program 9A can provide a function of determining whether probability that the user will move on a road at the intersection after the user approaches the intersection is high, based on change in an air-pressure value as a detection result of the air-pressure sensor 19. Specifically, the control program 9A can acquire an air-pressure change amount per unit time as a detection result of the air-pressure sensor 19. If the air-pressure change amount per unit time exceeds an air-pressure threshold value, the control program 9A can determine that the probability that the user of the subject apparatus will cross the road at the intersection is not high. For example, the air-pressure threshold value corresponds to an air-pressure change amount measured by the air-pressure sensor 19 when the user carrying the subject apparatus is walking down steps or when the user carrying the subject apparatus is running down steps. For example, the air-pressure threshold value also corresponds to an air-pressure change amount measured by the air-pressure sensor 19 when the user carrying the subject apparatus is walking up steps or when the user carrying the subject apparatus is running up steps.

If the probability that the user will move on a road at the intersection is high as a result of determination, the control program 9A can provide a function of sending a notification that the user will move on the intersection to the roadside unit. Conversely, if the probability that the user will move on a road at the intersection is not high as a result of determination, the control program 9A can provide a function of not sending a notification that the user will move on the intersection to the roadside unit.

The control program 9A can also determine whether the user of the subject apparatus is moving in a predetermined movement manner by using, in place of or as an auxiliary of the accelerometer 15, at least one of the azimuth sensor 16, the gyroscope 17, the microphone 8, the camera 12, the camera 13, a GPS receiver (not shown), etc.

The air-pressure data 9B includes data of a value of air pressure acquired by the air-pressure sensor 19. The air-pressure data 9B may include all measurement results measured by the air-pressure sensor 19.

The acceleration data 9C includes a value of acceleration acquired by the accelerometer 15. The acceleration data 9C includes direction and magnitude of acceleration acquired by the accelerometer 15. The acceleration data 9C may include all measurement results measured by the accelerometer 15.

The movement determination data 9D includes, for example, information of determination conditions that is used for determining a moving state of the user of the smartphone 1. The information of determination conditions may include direction and magnitude of acceleration that affects the subject apparatus, an acceleration pattern consisting of time-series changes of direction and magnitude of acceleration, or a combined vector in which acceleration in three axes of an X-axis, a Y-axis, and a Z-axis are combined. The information of determination conditions may include an air-pressure threshold value that is used for determining a change amount of change in air pressure that affects the subject apparatus per unit interval. The air-pressure threshold value corresponds to, for example, a change amount of air pressure obtained when a value of atmospheric pressure naturally changes. The air-pressure threshold value may include both of an increase amount of air pressure obtained when a value of atmospheric pressure naturally changes and a decrease amount of air pressure obtained when a value of atmospheric pressure naturally changes.

The roadside-unit data 9E corresponds to information about a roadside unit 200 (see FIG. 2, for example) as a destination of the notification of movement. The roadside-unit data 9E includes, for example, information of a frequency band used for the dedicated short range communications in the intelligent transport systems, etc.

The setting data 9Z includes information about various settings concerning operation of the smartphone 1.

The controller 10 comprises at least one processor for providing control and processing capability to implement various functions as described in further detail below. In accordance with various embodiments, the at least one processor may be implemented as a single integrated circuit (IC) or as multiple communicatively coupled IC's and/or discrete circuits. It is appreciated that the at least one processor can be implemented in accordance with various known technologies.

In one embodiment, the processor comprises one or more circuits or units configurable to perform one or more data computing procedures or data processes by executing instructions stored in an associated memory, for example. In other embodiments, the processor may be implemented as firmware (e.g. discrete logic components) configured to perform one or more data computing procedures or processes.

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In one example, the controller 10 comprises an arithmetic processing unit, for example. The arithmetic processing unit comprises, for example, a central processing unit (CPU), a system-on-a-chip (SoC), a micro control unit (MCU), a field-programmable gate array (FPGA), and a coprocessor. Not only limited to the above, the arithmetic processing unit may also comprise other components. The controller 10 can integrally control operation of the smartphone 1 to implement various functions. The controller 10 is one example of a control unit.

Specifically, the controller 10 can execute a command that is contained in a program stored in the storage 9, simultaneously with referring to data stored in the storage 9 as necessary. Then, the controller 10 can control a function unit in accordance with the data or the command, to thereby implement various functions. The function unit comprises, for example, the display 2A, the communication unit 6, the microphone 8, and the speaker 11. Not only limited to the above, the function unit may also comprise other components. The controller 10 may change control depending on a detection result of a detection unit. The detection unit comprises, for example, the touch screen 2B, the button 3, the illuminance sensor 4, the proximity sensor 5, the microphone 8, the camera 12, the camera 13, the accelerometer 15, the azimuth sensor 16, the gyroscope 17, the magnetic sensor 18, and the air-pressure sensor 19. Not only limited to the above, the detection unit may also comprise other components.

The controller 10 can implement each processing below by executing the control program 9A. The controller 10 can implement processing of determining whether the user of the subject apparatus is moving in a predetermined movement manner, based on an acceleration value as a detection result of the accelerometer 15. If the controller 10 determines that the user of the subject apparatus is moving in a predetermined movement manner, the controller 10 can implement processing of detecting approach of the user to an intersection by receiving a radio wave sent from a roadside unit. If the controller 10 detects approach of the user of the subject apparatus to an intersection, the controller 10 can implement processing of determining whether probability that the user will move on a road at the intersection after the user approaches the intersection is high, based on change in an air-pressure value as a detection result of the air-pressure sensor 19. If the probability that the user will move on a road at the intersection is high as a result of determination, the controller 10 can implement processing of sending a notification that the user will move on the intersection to the roadside unit. If the probability that the user will move on a road at the intersection is not high as a result of determination, the controller 10 can implement processing of not sending a notification that the user will move on the intersection to the roadside unit.

The speaker 11 can output a sound signal sent from the controller 10 as sound. The speaker 11 is, for example, used for outputting a ringtone and music. One of the receiver 7 and the speaker 11 may perform the function of the other.

The camera 12 and the camera 13 can convert their capturing image into an electrical signal. The camera 12 is an in-camera that captures an image of an object that faces the display 2A. The camera 13 is an out-camera that captures an image of an object that faces a surface on the opposite side of the display 2A. The camera 12 and the camera 13 may be implemented in the smartphone 1 as a camera unit that can be used by switching the in-camera and the out-camera in a functionally and physically integrated state.

The connector 14 is a terminal to which another device is connected. The connector 14 may be a terminal of Universal Serial Bus (USB), a terminal of High-Definition Multimedia Interface (trademark) (HDMI), a terminal of Light Peak (Thunderbolt (trademark)), and a general terminal such as an earphone-microphone connector. The connector 14 may be a dedicated terminal such as a dock connector. Examples of a device to be connected to the connector 14 include an external storage, a speaker, and a communication device. Components included as the device to be connected to the connector 14 are not only limited thereto.

The accelerometer 15 can measure direction and magnitude of acceleration that affects the smartphone 1. The accelerometer 15 is one example of an accelerometer. The azimuth sensor 16 can, for example, detect a direction of geomagnetism, and can measure a direction (azimuth) of the smartphone 1 based on the direction of geomagnetism. The gyroscope 17 can detect an angle and angular velocity of the smartphone 1. The magnetic sensor 18 can detect magnetic force around the smartphone 1.

The air-pressure sensor 19 can measure air pressure that affects the smartphone 1. The air-pressure sensor 19 is one example of an air-pressure sensor. The air-pressure sensor 19 can output a measured air-pressure value to the controller 10. The air-pressure sensor 19 can also output an air-pressure change amount per unit time to the controller 10, based on a measurement result of air pressure that affects the subject apparatus. The air-pressure change amount may be a value obtained by accumulating an absolute value or a scalar quantity. As the unit time, any time may be set.

The smartphone 1 may comprise a GPS receiver and a vibrator, in addition to each function unit of the above. The GPS receiver can receive a radio wave signal in a predetermined frequency band from GPS satellites. The GPS receiver can perform demodulation processing on an incoming radio wave signal, and can send out the processed signal to the controller 10. The GPS receiver can assist with processing of calculating the current position of the smartphone 1. The smartphone 1 may comprise a receiver that can receive a signal from positioning artificial satellites other than GPS satellites, and may thereby execute processing of calculating the current position. The vibrator can vibrate a part of or the entire smartphone 1. The vibrator comprises a piezoelectric element or an eccentric motor, for example, in order to generate vibration. In the smartphone 1, a function unit such as a battery that is naturally used to maintain the functions of the smartphone 1 as well as a control unit that is naturally used to implement control of the smartphone 1 are implemented.

The smartphone 1 may access a cloud storage server via the communication unit 6, and may execute processing of receiving, from the storage server, map information provided with positional information of intersections. The map information provided with positional information of intersections may be stored in the storage server in advance. The smartphone 1 can refer to the map information provided with positional information of intersections. The positional information of intersections includes, for example, positional coordinates representing an intersection.

Referring to FIG. 2 to FIG. 6, description will be given of one example of processing of the smartphone 1 according to one embodiment. FIG. 2 to FIG. 6 each illustrate an explanatory schematic diagram of one example of processing of the smartphone 1 according to one embodiment.

Figure 2:
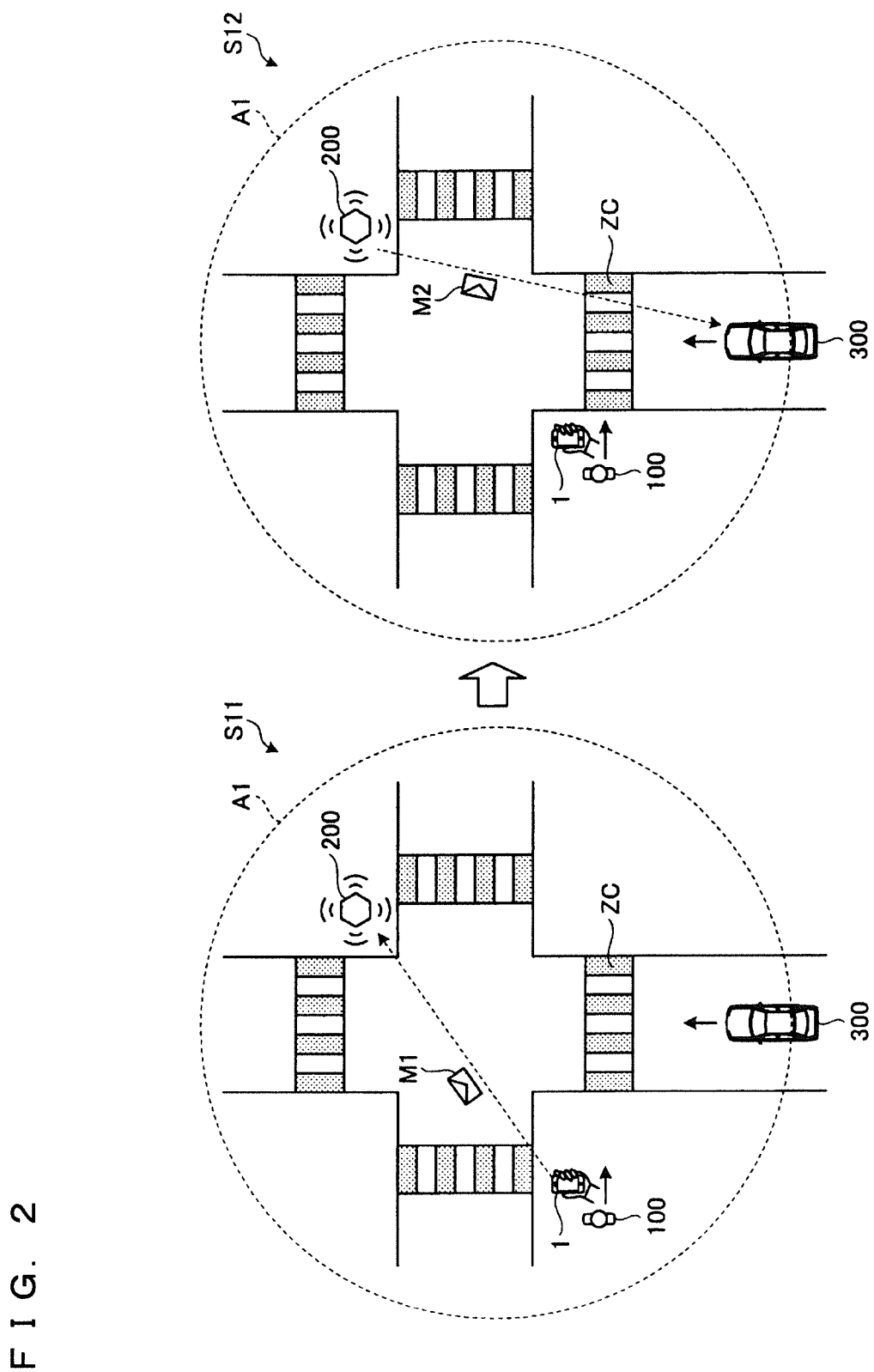
FIG. 2 illustrates an explanatory schematic diagram of one example of processing of the smartphone.

Referring to FIG. 2, description will be given of one example where a notification is sent from the smartphone 1 to a roadside unit. In one example illustrated in FIG. 2, a user 100 of the smartphone 1 is moving by walking toward a pedestrian crossing ZC at an intersection. A communication area A1 illustrated in FIG. 2 indicates a range in which another apparatus can receive a radio wave sent from a roadside unit 200.

The smartphone 1 determines whether the user 100 of the subject apparatus is moving in a predetermined movement manner. If the smartphone 1 determines that the user 100 of the subject apparatus is moving in a predetermined movement manner (e.g. on foot), the smartphone 1 detects approach of the user 100 to the intersection by receiving a radio wave sent from the roadside unit 200. Alternatively, the smartphone 1 may receive a signal from positioning artificial satellites such as GPS satellites and map information provided with positional information of intersections, and may detect approach of the user 100 to the intersection based on the received information. Specifically, for example, the smartphone 1 compares the current position calculated based on a signal from positioning artificial satellites such as GPS satellites with the positional information of intersections provided in the received map information. Then, for example, if the smartphone 1 determines based on the comparison result that the distance between the positional coordinates of the current position and the positional coordinates representing the intersection reaches a predetermined value, the smartphone 1 determines that the user 100 approaches the intersection. With this, approach of the user 100 to an intersection is detected. Note that, approach of the user 100 to an intersection can also be said as approach of the subject apparatus to an intersection.

If the smartphone 1 detects that the user 100 is moving in a predetermined movement manner and that the user 100 approaches an intersection, the smartphone 1 determines whether probability that the user 100 will move on a road (e.g. the pedestrian crossing ZC) at the intersection after the user 100 approaches the intersection is high, based on change in an air-pressure value as a detection result of the air-pressure sensor 19.

If the probability that the user 100) will move on a road at the intersection is high as a result of determination, as illustrated in FIG. 2, the smartphone 1 sends a notification M1 that the user 100 will move on the intersection to the roadside unit 200 (Step S11).

Upon receiving the notification M1 from the smartphone 1, as illustrated in FIG. 2, the roadside unit 200 sends toward the communication area A1 a notification M2 for calling attention to the vicinity of the intersection (Step S12). In one embodiment, the roadside unit 200 supports a communication standard for enabling communication with the smartphone 1. The roadside unit 200 also supports a communication standard for enabling communication with an on-board device mounted in a vehicle 300. The roadside unit 200 may be divided into a sending roadside unit that sends signals to the smartphone 1 and a receiving roadside unit that receives signals from the smartphone 1.

In one example illustrated in FIG. 2, the notification M2 sent from the roadside unit 200 is, for example, received by the vehicle 300 (on-board device) traveling within the communication area A1.

Figure 3:
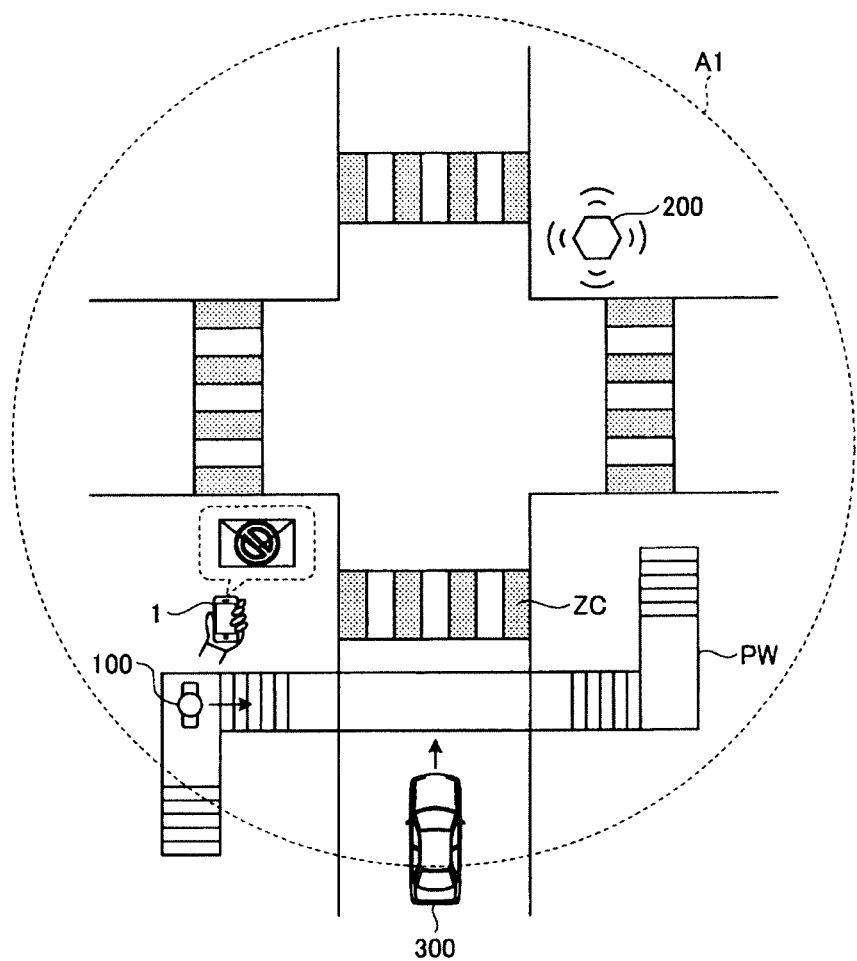
FIG. 3 illustrates an explanatory schematic diagram of one example of processing of the smartphone.
Figure 4:
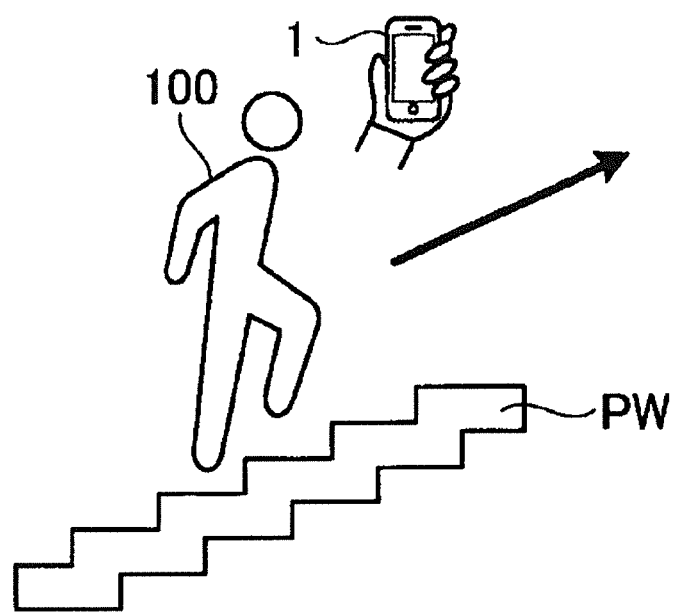
FIG. 4 illustrates an explanatory schematic diagram of one example of processing of the smartphone.

Referring to FIG. 3 and FIG. 4, description will be given of one example where a notification is not sent from the smartphone 1 to the roadside unit 20X). In one example illustrated in FIG. 3, the user 100 of the smartphone 1 is moving by walking on a pedestrian bridge PW built at the vicinity of an intersection.

Similarly to one example illustrated in FIG. 2, if the smartphone 1 detects that the user 100 of the subject apparatus is moving in a predetermined movement manner and that the user 100 approaches an intersection, the smartphone 1 determines whether probability that the user 100 will move on a road (e.g. the pedestrian crossing ZC) at the intersection after the user 100 approaches the intersection is high, based on change in an air-pressure value as a detection result of the air-pressure sensor 19. High probability that the user 100 will move on a road at an intersection can also be said as high probability that the subject apparatus will move on a road at an intersection.

As illustrated in FIG. 4, when the user 100 is moving on the pedestrian bridge PW, an air-pressure change amount per unit time exceeds an air-pressure threshold value. Accordingly, as described in the above, the smartphone 1 can derive a determination result that the probability that the user 100 will move on a road (e.g. the pedestrian crossing ZC) at the intersection is not high, based on change in an air-pressure value detected by the air-pressure sensor 19.

If the probability that the user 100 will move on a road at the intersection is not high as a result of determination, as illustrated in FIG. 3, the smartphone 1 does not send a notification that the user 100 will move on the intersection to the roadside unit 200.

Figure 5:
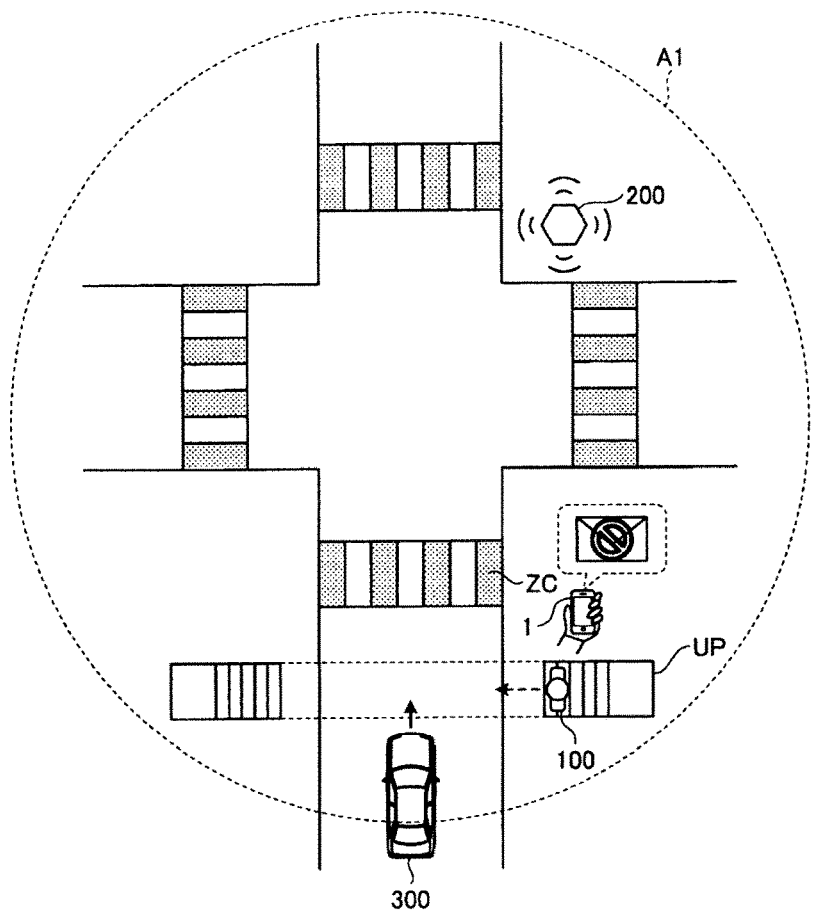
FIG. 5 illustrates an explanatory schematic diagram of one example of processing of the smartphone.
Figure 6:
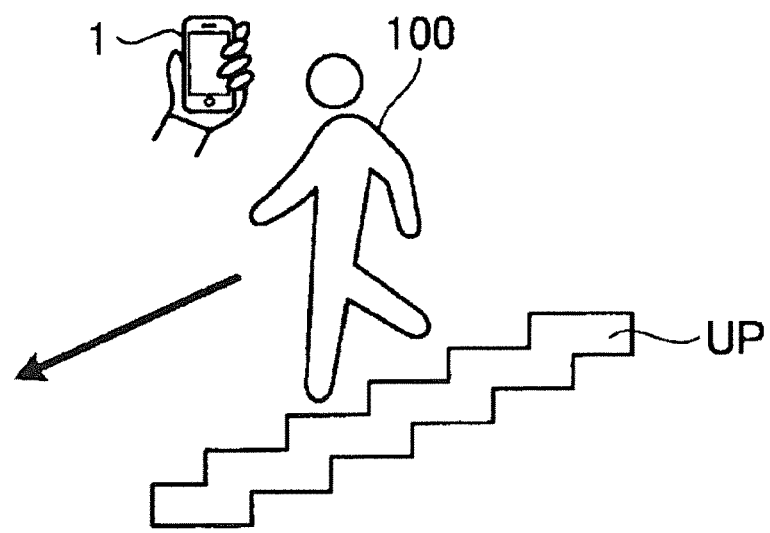
FIG. 6 illustrates an explanatory schematic diagram of one example of processing of the smartphone.

Referring to FIG. 5 and FIG. 6, description will be given of one example where a notification is not sent from the smartphone 1 to the roadside unit 200. In one example illustrated in FIG. 5, the user 100 of the smartphone 1 is moving by walking in a pedestrian underpass UP built at the vicinity of an intersection.

Similarly to one example illustrated in FIG. 2, if the smartphone 1 detects that the user 100 of the subject apparatus is moving in a predetermined movement manner and that the user 100 approaches an intersection, the smartphone 1 determines whether probability that the user 100 will move on a road (e.g. the pedestrian crossing ZC) at the intersection after the user approaches the intersection is high, based on change in an air-pressure value as a detection result of the air-pressure sensor 19.

As illustrated in FIG. 6, when the user 100 is moving in the pedestrian underpass UP, an air-pressure change amount per unit time exceeds an air-pressure threshold value. Accordingly, the smartphone 1 can derive a determination result that the probability that the user 100 will move on a road (e.g. the pedestrian crossing ZC) at the intersection is not high, based on change in an air-pressure value detected by the air-pressure sensor 19.

If the probability that the user 100 will move on a road at the intersection is not high as a result of determination, as illustrated in FIG. 5, the smartphone 1 does not send a notification that the user 100 will move on the intersection to the roadside unit 200.

Figure 7:
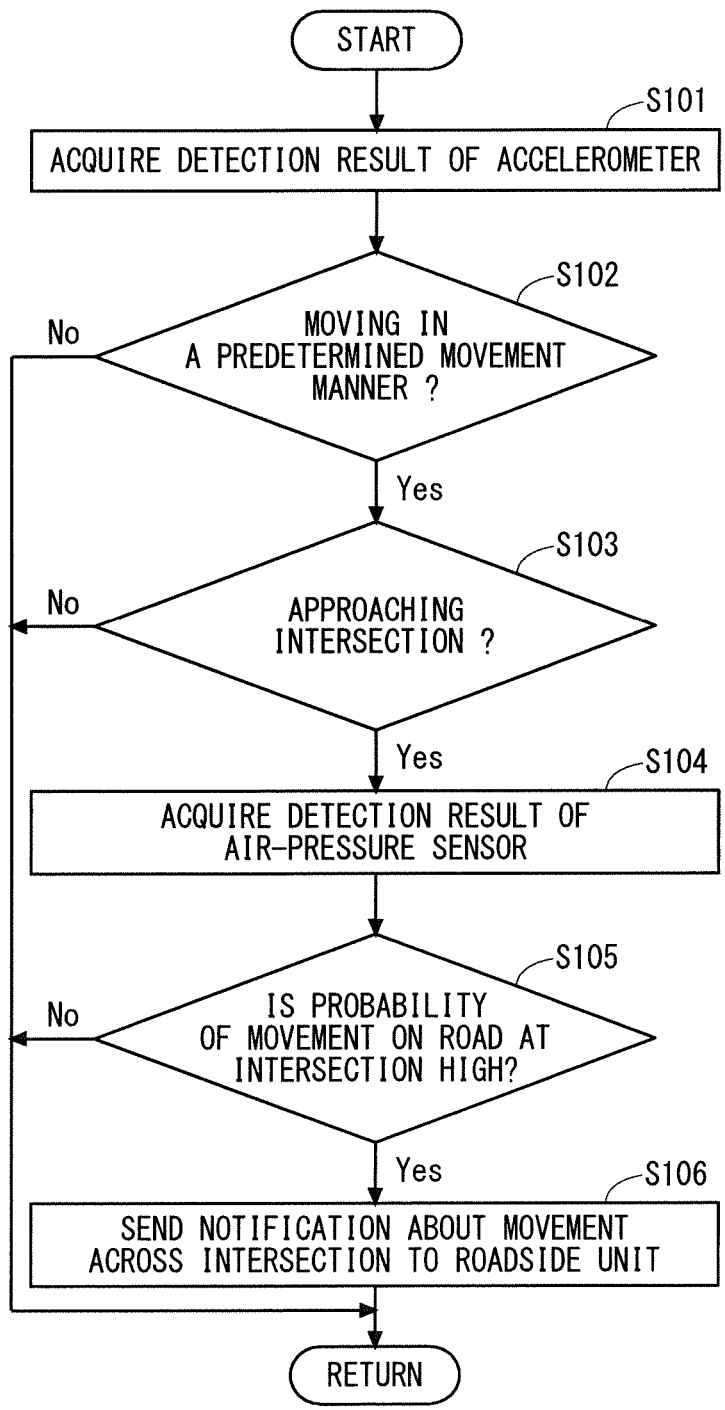
FIG. 7 illustrates a flowchart showing one example of processing executed by the smartphone.

Referring to FIG. 7, description will be given of a flow of processing executed by the smartphone 1 according to one embodiment. FIG. 7 illustrates a flowchart showing one example of processing executed by the smartphone 1 according to one embodiment. The processing illustrating in FIG. 7 is implemented by the controller 10 executing the control program 9A stored in the storage 9. Note that, the processing illustrated in FIG. 7 is repeatedly executed if the smartphone 1 is operable. The smartphone 1 may repeatedly execute the processing illustrated in FIG. 7 even when the smartphone 1 is in a mode of partially limiting power supply control, i.e., a power saving mode.

As illustrated in FIG. 7, the controller 10 acquires a detection result of the accelerometer 15 (Step S101).

Subsequently, the controller 10 determines whether the user 100 of the smartphone 1 is moving in a predetermined movement manner, based on the detection result of the accelerometer 15 (Step S102).

If the user 100 is moving in a predetermined movement manner as a result of determination (Step S102, Yes), the controller 10 determines whether the user 100 is approaching the intersection (Step S103).

If the user 100 is approaching the intersection as a result of determination (Step S103, Yes), the controller 10 acquires a detection result of the air-pressure sensor 19 (Step S104).

The controller 10 determines whether probability that the user 100 will move on a road at the intersection is high, based on the detection result of the air-pressure sensor 19 (Step S105).

If the probability that the user 100 will move on a road at the intersection is high as a result of determination (Step S105, Yes), the controller 10 sends a notification that the user 100 will move on the intersection to the roadside unit 200 (Step S106), and returns to the processing procedure of Step S101.

Conversely, if the probability that the user 100 will move on a road at the intersection is not high as a result of determination (Step S105, No), the controller 10 does not execute the notification of Step S106, and returns to the processing procedure of Step S101.

In Step S103 of the above, if the user 100 is not approaching the intersection as a result of determination (Step S103, No), the controller 10 returns to the processing procedure of Step S101.

In Step S102 of the above, if the user 100 is not moving in a predetermined movement manner as a result of determination (Step S102, No), the controller 10 returns to the processing procedure of Step S101.

As is described in the above, if probability that the user will move on a road at an intersection right after the user approaches the intersection in a predetermined movement manner is high, the smartphone 1 according to one embodiment sends a notification that the user will move on the intersection to the roadside unit 200). Conversely, if probability that the user will move on a road at an intersection right after the user approaches the intersection in a predetermined movement manner is not high, the smartphone 1 does not send a notification that the user will move on the intersection to the roadside unit 200. Thus, frequency of notifications sent from the smartphone 1 to the roadside unit 200 is decreased.

In embodiments of the above, description has been given of a condition where the user moves by walking or a condition where the user moves by running, as one example of a case of determining that the smartphone 1 is moving in a predetermined movement manner. A case where the user moves in a predetermined movement manner may include a condition where the user moves by his/her own effort with a bicycle, a unicycle, a skateboard, a kick scooter, etc.

Description herein has been given of characteristic embodiments for the purpose of completely and clearly disclosing a technology relating to the attached claims. The attached claims, however, should not be limited to the above embodiments, but should be embodied by all of the modifications and alternative configurations that may be created by a person skilled in the art within the scope of basic matters described herein.

The invention claimed is:

1. An electronic apparatus comprising:
an accelerometer configured to detect an acceleration value;
an air-pressure sensor configured to detect an air-pressure value;
a communication unit configured to receive information for recognizing approach of a user of the electronic apparatus to an intersection; and
an at least one processor configured to determine whether the user is moving in a predetermined movement manner based on the acceleration value, wherein
the at least one processor detects approach of the user to the intersection based on reception of the information if the user is moving in a predetermined movement manner,
the at least one processor performs determination processing of determining whether probability that the user will move on a road at the intersection after the user approaches the intersection is high based on change in the air-pressure value if the at least one processor detects approach of the user to the intersection,
the at least one processor sends a notification that the user will move on the intersection to a roadside unit if the probability that the user will move on a road at the intersection is high as a result of the determination processing, and
the at least one processor does not send a notification that the user will move on the intersection to a roadside unit if the probability that the user will move on a road at the intersection is not high as a result of the determination processing, wherein
the at least one processor performs determination processing of determining, based on a change in the detected air-pressure value, whether an elevation of the user changes, and
based on a determination of a change in elevation of the user, the at least one processor performs determination processing of determining whether the probability that the user will move on the road at the intersection is high.

2. The electronic apparatus according to claim 1, wherein the information comprises a radio wave sent from a roadside unit, the roadside unit being configured to send the radio wave that can be received by an apparatus present inside a predetermined communication area including the intersection.

3. The electronic apparatus according to claim 1, wherein the at least one processor determines that a condition where the user moves by his/her own effort is a condition where the user is moving in the predetermined movement manner.

4. The electronic apparatus according to claim 1, wherein the at least one processor determines that probability that the user will cross the intersection is not high if an air-pressure change amount per unit time exceeds a threshold value.

5. A control method executed by an electronic apparatus, the electronic apparatus comprising:
    an accelerometer configured to detect an acceleration value;
    an air-pressure sensor configured to detect an air-pressure value; and
    a communication unit configured to receive information for recognizing approach of a user of the electronic apparatus to an intersection,
the control method comprising the steps of:
    determining whether the user is moving in a predetermined movement manner based on the acceleration value;
    detecting approach of the user to the intersection based on reception of the information if the user is moving in a predetermined movement manner;
    determining whether probability that the user will move on a road at the intersection after the user approaches the intersection is high based on change in the air-pressure value if approach of the user to the intersection is detected; and
    sending a notification that the user will move on the intersection to a roadside unit if determination is made that the probability that the user will move on a road at the intersection is high, wherein
the control method further comprises:
    determining, based on a change in the detected air-pressure value, whether an elevation of the user changes; and
    based on a determination of a change in elevation of the user, determining whether the probability that the user will move on the road at the intersection is high.

6. A non-transitory computer-readable recording medium storing a control program of making an electronic apparatus execute processes,
the electronic apparatus comprising:
    an accelerometer configured to detect an acceleration value;
    an air-pressure sensor configured to detect an air-pressure value; and
    a communication unit configured to receive information for recognizing approach of a user of the electronic apparatus to an intersection,
the processes comprising:
    determining whether the user is moving in a predetermined movement manner based on the acceleration value;
    detecting approach of the user to the intersection based on reception of the information if the user is moving in a predetermined movement manner;
    determining whether probability that the user will move on a road at the intersection after the user approaches the intersection is high based on change in the air-pressure value if approach of the user to the intersection is detected; and
    sending a notification that the user will move on the intersection to a roadside unit if determination is made that the probability that the user will move on a road at the intersection is high, wherein
the processes further comprise:
    determining, based on a change in the detected air-pressure value, whether an elevation of the user changes; and
    based on a determination of a change in elevation of the user, determining whether the probability that the user will move on the road at the intersection is high.

* * * * *